G. A. CRANE.
AUXILIARY TIRE FOR VEHICLE WHEELS.
APPLICATION FILED NOV. 6, 1919.
1,384,240.
Patented July 12, 1921.
2 SHEETS—SHEET 2.
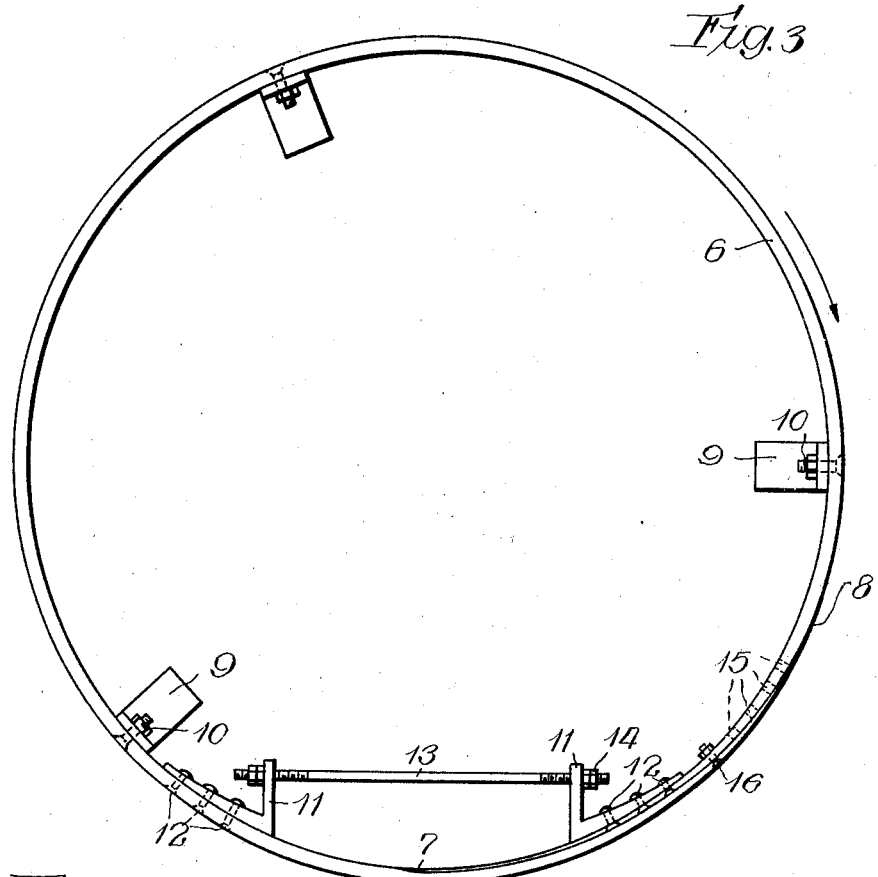
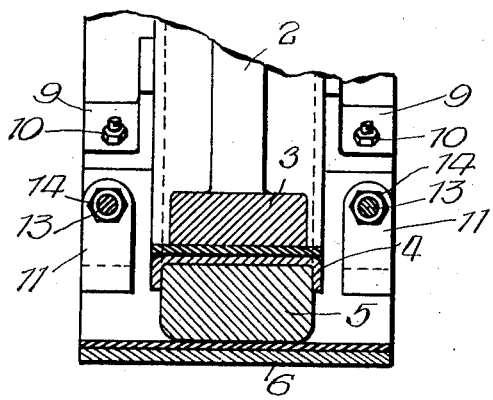
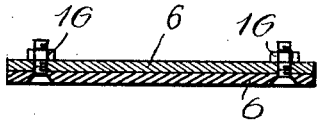
Inventor
G. A. Crane
By Arthur F. Durand
Atty

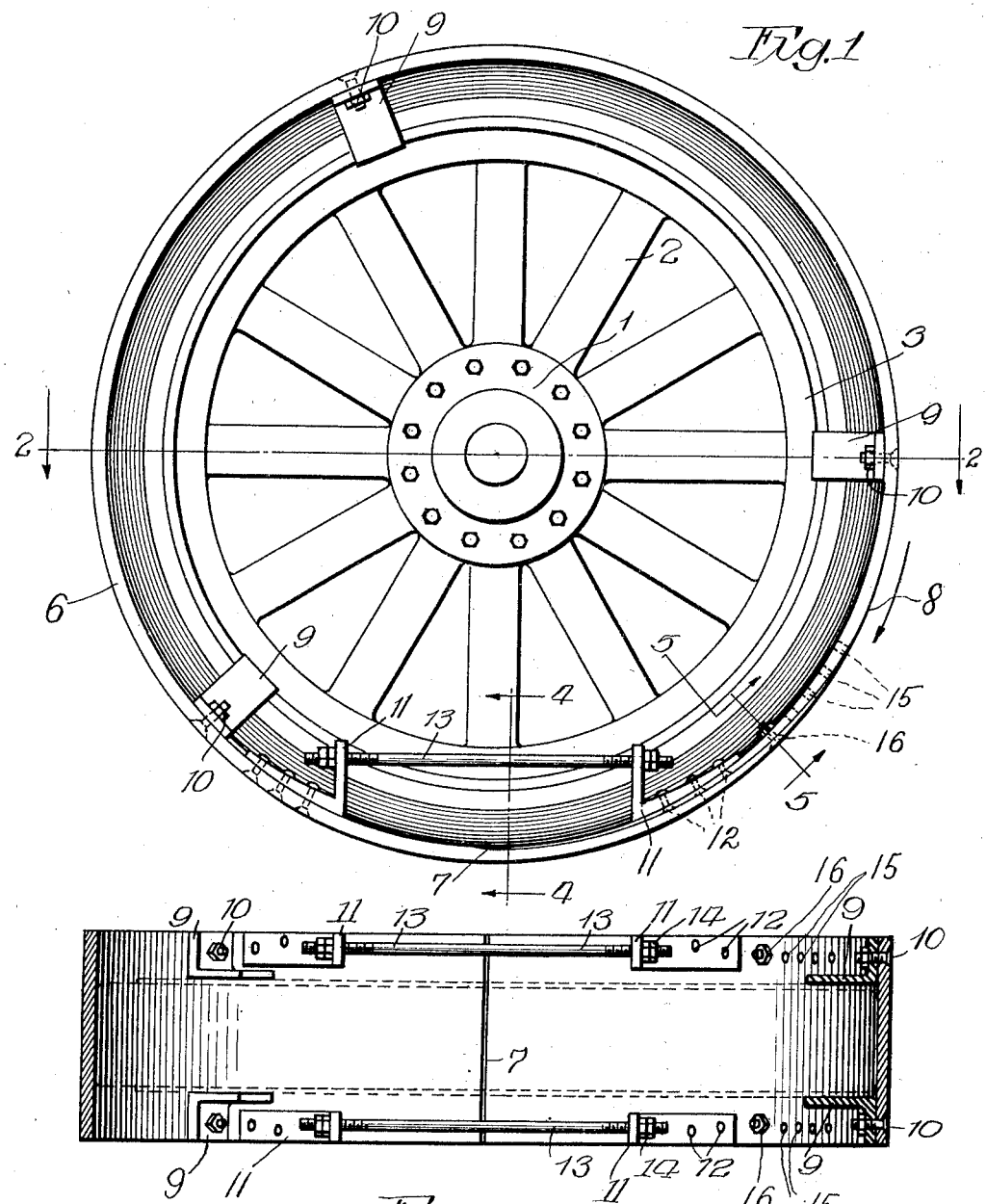

UNITED STATES PATENT OFFICE.

GEORGE A. CRANE, OF CHICAGO, ILLINOIS.

AUXILIARY TIRE FOR VEHICLE-WHEELS.

1,384,240. Specification of Letters Patent. Patented July 12, 1921.

Application filed November 6, 1919. Serial No. 336,093.

*To all whom it may concern:*

Be it known that I, GEORGE A. CRANE, a citizen of the United States of America, and a resident of Chicago, Illinois, have invented a certain new and useful Improvement in Auxiliary Tires for Vehicle-Wheels, of which the following is a specification.

This invention relates to auxiliary tires of the kind involving a flat steel band, which is detachably applied to the rubber tire of a truck or automobile wheel, to adapt the vehicle for travel over soft ground, and to protect the rubber tire. At the same time, however, the resiliency of the rubber tire is retained, as it carries the load and is free to yield, notwithstanding that it does not come in direct contact with the street. When not necessary, the auxiliary tire is removed from the wheel. A flat steel band thus adapted for use as an auxiliary tire can be applied to all four wheels of an automobile or truck, or merely to the rear wheels, depending upon circumstances.

Generally stated, therefore, the object of the present invention is to provide a novel and efficient auxiliary tire of the foregoing general character, and to provide improved means for detachably mounting the tire on the wheel, so that the steel band which forms the auxiliary tire may be readily applied to wheels of different diameters and easily removed therefrom.

It is also an object to provide certain details and features of construction and combinations tending to increase the general efficiency and the desirability of a vehicle wheel attachment of this particular character.

To these and other useful ends the invention consists in matters hereinafter set forth and claimed and shown in the accompanying drawings, in which—

Figure 1 is a side elevation of a wheel equipped with an auxiliary steel tire embodying the principles of the invention.

Fig. 2 is a horizontal section on line 2—2 in Fig. 1, the wheel construction being omitted.

Fig. 3 is a side elevation of the auxiliary tire shown in Fig. 1.

Fig. 4 is an enlarged detail section on line 4—4 in Fig. 1.

Fig. 5 is an enlarged detail section on line 5—5 in Fig. 1.

As thus illustrated, the vehicle wheel may be of any suitable character, being provided with the usual hub 1 and spokes 2, and the felly 3, together with the channel rim 4 containing the rubber tire 5, which latter is solid or of any known or approved character.

The auxiliary steel tire comprises a flat steel band in the form of a broad hoop 6 which has lapping end portions, the inner end portion being gradually thinned until it terminates at 7, and the outer end portion being correspondingly and gradually thinned until it terminates at 8, the points 7 and 8 being some distance apart to provide a long lap joint the thickness of which at all points is substantially the same as the thickness of the band. The width of the band will depend upon the character of the wheel, and the load or work to be imposed thereon, and for a single tread tire such as shown the band will be somewhat wider than the tire, as shown in Fig. 4, so that a broad tread will be provided to support the load when the vehicle travels over soft ground. At intervals in the circumference thereof the band is provided with angle pieces 9, which are removably secured in place by bolts 10, these angle pieces embracing the tire and channel rim of the wheel to prevent lateral displacement of the band. Also, at opposite sides of the wheel, and at opposite sides of the lap joint, the band is provided with angle pieces 11 which are secured by rivets 12 to the band. The two angle pieces 11 at one side of the wheel are connected together by a screw threaded rod 13, and a similar rod connects together the two angle pieces 11 at the other side of the wheel, these rods being provided with nuts 14 which when tightened serve to contract the band, and to reduce the diameter thereof, thereby to tighten the band on the rubber tire of the wheel. The splice or lap joint, it will be seen, which extends from 7 to 8, is of such length that considerable adjustment is afforded in this respect, without materially changing the character of the lap joint; for, if necessary, the band can be expanded to increase its diameter quite a little. The inner end portion of the band at the lap joint is provided with a series of holes 15 at each side of the wheel, and the outer end portion of the band is provided with bolts 16 for adjustable engagement with said holes, depending upon the diameter desired for the band, these bolts serving to hold the outer thickness of the lap joint tightly in place at points sufficiently near the thin edge 8 of the outer end portion of the band to insure against opening of the joint while the wheel is traveling along the ground under a load. As the bolts 16, of course, are necessarily a distance from the point 8, it follows that the wheel desirably rotates in the direction of the arrow shown in Figs. 1 and 3, so that the edge 8 will not be liable to be torn away from its proper position by contact with the ground, or with obstacles over which the wheel may be compelled to roll. When it is desired to remove the steel band from the wheel, the nuts 14 are loosened, so as to disconnect the rods 13, and the bolts 16 are disengaged from the holes 15, thus permitting the steel band, which is in one sense a split collar, to spring outward and disengage itself from the rubber tire of the wheel. Also, the angle piece guards 9 will be removed at one side of the wheel, thus permitting the steel band to be displaced or removed laterally from the rubber tire.

With this construction, therefore, it is apparent that the steel band forming the auxiliary tire is adapted to be attached in place without the necessity of mutilating the wheel, and without making any changes in or additions to the structure of the wheel, everything necessary for the auxiliary tire being carried by or embodied in the attachment itself, so that it is attachable to an ordinary automobile or truck wheel. The steel band is resilient, and in combination with the rubber tire insures sufficient resiliency to give the desired results when the vehicle travels over rough ground or over a rough street surface. At the same time, however, the auxiliary tire protects the rubber tire and affords a broad flat tread which will travel on a street surface, or over soft ground, under a heavy load, thus providing means for quickly adapting an ordinary automobile or truck for heavier duty or for the purposes for which the ordinary rubber tire is not exactly suitable. It will be understood, of course, that the steel band may have a plain, smooth tread surface, or that this surface may be rendered rough or broken by teeth or protuberances located thereon, in any suitable or desired manner, if such is necessary or desirable.

What I claim as my invention is:—

1. The combination of a wheel having a yielding and resilient tire, a one-piece resilient band encircling the wheel and seated on the tread of said tire, said band being flat in cross section and annular in form to provide a resilient auxiliary tire for the wheel, the band being divided at one side to provide integral lapping end portions which form a splice and which can be adjusted relatively to increase or reduce the diameter of the band, according to the diameter of said yielding and resilient tire, while maintaining a continuous or unbroken tread surface for the band, adjusting devices within the area circumscribed by the band, and means on the inner surface of the band to support said devices and thereby adjustably connect the end portions of the band together for relative adjustment, so that by tightening said devices one end portion of the band will slide upon the other end portion to contract the band upon the resilient tire, and whereby the auxiliary tire and everything necessary for the attachment thereof to an ordinary wheel are readily removable therefrom.

2. A structure as specified in claim 1, in combination with bolts inserted through the lapping end portions of the band, said bolts being spaced a distance circumferentially from said adjusting devices and located in accessible positions at opposite sides of the resilient tire.

3. A structure as specified in claim 1, said devices being disposed at opposite sides of the wheel, and the inner end of the band terminating in a thin edge.

4. A structure as specified in claim 1, in combination with retaining means inserted through the said splice or lap joint formed by said lapping end portions of the band.

5. A structure as specified in claim 1, each end portion of the band being gradually reduced in thickness and thinned toward its end edge, so that a relatively long lap joint is provided which is substantially the same in thickness as the other portions of the band, in combination with retaining means extending through the two reduced portions forming the splice or lap joint.

6. A structure as specified in claim 1, the outer end portion of the band being gradually reduced in thickness to terminate in a thin end edge on the face of the band.

7. A structure as specified in claim 1, the outer end portion of the band being gradually reduced in thickness to terminate in a thin end edge on the face of the band, in combination with bolts inserted through said reduced thickness of the band to hold said outer end edge in place.

GEORGE A. CRANE.